UNITED STATES PATENT OFFICE.

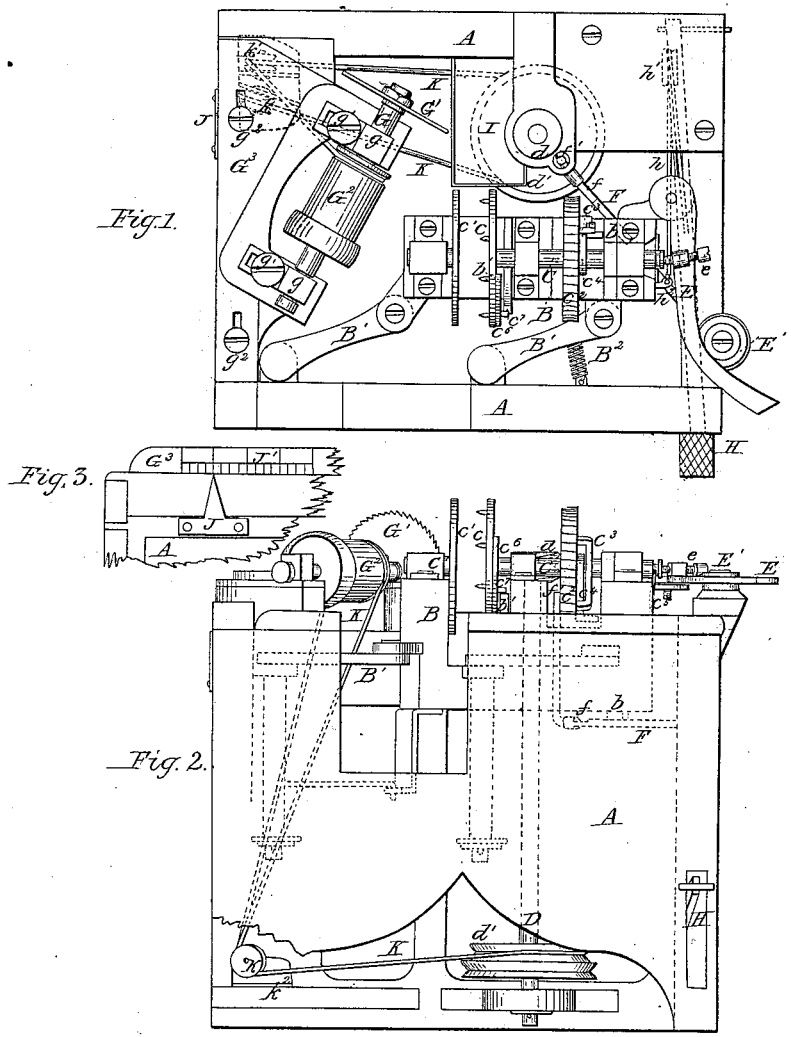

OWEN REDMOND, OF ROCHESTER, NEW YORK.

Letters Patent No. 84,509, dated December 1, 1868; antedated November 19, 1868.

IMPROVEMENT IN MACHINES FOR ROUNDING BARREL-HEADS.

The Schedule referred to in these Letters Patent and making part of the same.

*To all whom it may concern:*

Be it known that I, OWEN REDMOND, of Rochester, county of Monroe, and State of New York, have invented new and useful Improvements on Barrel-Head-Rounding Machine; and I do hereby declare that the following is a full and exact description thereof, reference being had to the accompanying drawings, and to the letters of reference marked thereon, in which—

Figure 1 represents a plan or top view of my machine;

Figure 2, a front view of the same; and

Figure 3, a view of the index by which the diameter to be cut is gauged.

It is found, in practice, that to cut a barrel-head completely all round, with a circular saw, it is necessary that the wood to be cut perform more than a complete revolution every time that a head is finished, in order to allow for the oblique cut which the saw makes on entering the stuff; and The object of my invention is to provide a machine which will bring the wood up to the saw, to be cut, retain it there until it has made more than a complete revolution, and then withdraw it from the saw, causing the parts to be in proper position for the adjustment of a new head; to which end My improvements consist in a suitable arrangement of mechanism for retaining the wood to be cut against the saw, until the wood has performed more than a complete revolution, and afterwards withdrawing it from the saw.

In the accompanying drawings, A represents the frame of the machine. B represents a movable frame or carriage, which is pivoted to the frame A by the links $B^1$; and $B^2$, a spiral spring, whose tendency is to retain it in the position shown by the drawings.

A saw-mandrel, G, to which the saw $G^1$ is secured, rotates in bearings on an adjustable frame, $G^3$, and is set at such an angle with the carriage B as will produce the desired bevel upon the edge of the barrel-head. The saw-mandrel has upon it a balance-pulley, $G^2$, which carries the belt which gives motion to the parts. The screws $g^1 g^1$ pass through slots in the bearings $g g$ of the mandrel, to secure the same to the adjustable frame $G^3$, which enables the position of the saw to be varied for cutting different thicknesses of heads. The frame $G^3$ is secured to the main frame A by screws $g^2$, passing through slots in $G^3$. This arrangement enables the saw to be adjusted for cutting different diameters of heads. An index, J, attached to the frame A, in conjunction with a gauge, J', upon the adjustable frame $G^3$, enables the attendant to set the saw in proper position for cutting any required diameter.

The links $B^1$, which are of equal length, are pivoted at one end to the frame A, and at the other to the carriage B, which maintains the carriage parallel to the front of the frame, and always at the same angle with the saw $G^1$, whatever its distance therefrom may be. A vertical shaft, D, is mounted in bearings in the frame, near the rear thereof, and rotated by means of the cord K, which passes over the pulley $G^2$, guide-pulleys $k k^1$, and pulley $d'$, on the shaft D. The guide-pulleys $k k^1$ have their bearings in a shell or casting, $k^2$, near the bottom of the frame. They are set at an angle with each other, corresponding with their distance from the shaft D and the diameter of the pulley $d'$, and afford a convenient means of changing the direction of the cord K.

Shafts C C' rotate in bearings upon the carriage B, having disk-clamps $c c^1$ secured thereon. The shaft C carries a worm-wheel, $c^2$, which gears with a screw, $d$, upon the shaft D, whenever the carriage is moved into sufficient proximity thereto. This is done by means of a foot-lever, H, to which a cord, $h$, is attached, which passes over a pulley, $h^1$, on the frame, and is secured to a ring, $h^2$, in the carriage B. The carriage is held in position for the screw $d$ and worm-wheel $c^2$ to be in gear, by a stop, $b$, on its lower surface, engaging in a notch, $f$, in the spring-latch F.

The shaft C can be moved endwise in its bearings, for the purpose of pressing the clamps $c c^1$ together. This is done by means of a curved lever, E, pivoted to the carriage, and having its curved end bearing against a roller, E', on the frame, which, when the carriage is moved up towards the saw, causes the end of an adjustable screw, $e$, in the lever to press against the end of the shaft C, and force it up towards C'. A spring, $c^5$, draws the shaft back when the pressure from the lever E is discontinued.

The clamp $c$ is provided with points, to hold the wood to be cut upon one of its sides, and with a weight or drag, $c^6$, and pin, $c^7$, upon the other. A curved stop, $b'$, is pivoted to the carriage, in such manner that it will move upon its fulcrum, and allow the pin $c^7$ to pass when the shaft C is revolving in one direction, but hold it firmly from passing when the shaft revolves in the opposite direction.

A loop or long staple, $c^3$, is secured upon the side of the worm-wheel $c^2$, in which the end of a lever, $c^4$, which swings freely upon the shaft C, moves. The length of this loop is the measure, or nearly so, of the distance which the clamps will travel more than a revolution while the barrel-head is being sawed. I is a spout for carrying off the heads as they are finished.

The operation of the machine is as follows:

The saw-mandrel being put in rotation by a belt from the prime mover or its connections, the barrel-head to be sawed is placed between the clamps $c c$, and the attendant, pressing with his foot upon the lever H, the clamps are pressed together, holding the wood firmly between them, and the carriage moved up towards the saw, until in proper position for the head to be cut, when the screw $d$ gears with the worm-wheel $c^2$, and imparts revolution to the shafts C C', and consequently the clamps and wood held between them.

The carriage is held in this position by the stop $b$ and spring-latch F.

When, in the rotation of the shaft C, the end of the lever $c^4$ attains the vertical position above the shaft, it drops upon the point $f'$ of the spring-latch F, but without sufficient force to disengage the latter from the stop $b$, until, in the continued revolution of the shaft, the staple $c^3$ strikes against it, when it presses down the spring-latch F, disengaging the stop $b$ from the notch $f$, and the spring $B^2$ draws the carriage B away from the saw.

At the moment when the worm-wheel is drawn out of gear with the screw $d$, the weight $c^6$ draws back the clamp $c$ and shaft C, until the pin $c^7$ strikes the stop $b'$, and further motion is prevented. At the same time the lever $c^4$ drops down by its own gravity, until it strikes the lower end of the loop or staple $c^3$, when it is below the point $f'$ of the spring-latch, and the parts are in proper position to repeat the operation.

Having thus fully described my improved barrel-head-rounding machine,

What I claim therein as new, and desire to secure by Letters Patent, is—

The combination of the loop or staple $c^3$ and lever $c^4$ with the spring-latch F, when arranged and operating substantially as described, for the purpose of causing more than a complete revolution of the clamps $c$ $c^1$ to be made during the time that each barrel-head is being sawed.

OWEN REDMOND.

Witnesses:
E. M. REDMOND,
EDMUND REDMOND.